(12) United States Patent
Feller

(10) Patent No.: US 6,722,207 B1
(45) Date of Patent: Apr. 20, 2004

(54) ELECTRO-MAGNETIC FLOW TRANSDUCER WITH INSULATING SCROLL

(76) Inventor: Murray F. Feller, 21577 NW. 75th Avenue Rd., Micanopy, FL (US) 32667

( * ) Notice: Subject to any disclaimer, the term of this patent is extended or adjusted under 35 U.S.C. 154(b) by 0 days.

(21) Appl. No.: 10/100,453

(22) Filed: Mar. 19, 2002

(51) Int. Cl.[7] .................................................. G01F 1/58
(52) U.S. Cl. .................................................. 73/861.12
(58) Field of Search .................... 73/861.12, 861.14, 73/861.16, 861.17, 861.15

(56) References Cited

U.S. PATENT DOCUMENTS

| | | | | |
|---|---|---|---|---|
| 4,736,635 A | * | 4/1988 | Murase | 73/861.15 |
| 4,938,073 A | * | 7/1990 | Stephenson | 73/861.12 |
| 5,297,425 A | | 3/1994 | Hamby et al. | |
| 5,773,723 A | * | 6/1998 | Lewis et al. | 73/861.12 |
| 6,431,011 B1 | * | 8/2002 | Feller | 73/861.12 |
| 6,463,807 B1 | * | 10/2002 | Feller | 73/861.12 |
| 6,571,642 B1 | * | 6/2003 | Feller | 73/861.12 |

* cited by examiner

Primary Examiner—Edward Lefkowitz
Assistant Examiner—Jewel V. Thompson
(74) Attorney, Agent, or Firm—David Kiewit

(57) ABSTRACT

An electro-magnetic transducer interacts with a fluid in a tube and serves as either a flow sensor or as a pump. One or more electro-magnet(s) provide a magnetic flux transverse to a selected portion of the tube. The transducer has an electrically insulating sheet scrolled about an axis parallel to or coincident with that of the portion of the tube and extending from an axial streamlined body to an inner wall of the tube. One or more pair of electrodes are attached to the scroll so as to define a spiral electrical path between the two electrodes of the pair. These electrodes are connected to a voltage measurement circuit if the transducer is configured as a flow sensor or to a source of electric power if the transducer is configured as a pump. In addition, a flow commencement sensor is combined with the electro-magnetic flow sensor to provide a power-saving flow metering arrangement.

18 Claims, 4 Drawing Sheets

ELECTRO-MAGNETIC FLOW TRANSDUCER WITH INSULATING SCROLL

FIELD OF THE INVENTION

This invention relates to apparatus and method for determining the rate of flow of a fluid by measuring the electrical potential difference developed in the fluid as the fluid moves through a magnetic field and for causing an electrically conductive fluid to flow by application of an electric potential and a magnetic field.

BACKGROUND INFORMATION

When a fluid that is at least weakly electrically conductive flows in a magnetic field oriented transversely to the flow direction, an electric potential is generated in a fluid along an axis orthogonal to both the direction of flow and the magnetic field. Conversely, application an of orthogonally oriented electric potential and a magnetic field to a conductive fluid generate forces in the fluid that tend to make it move in a direction orthogonal to both the potential and the field. These interactions can be exploited in making a variety of transducers that comprise both magnetic flow meters and electro-magnetic pumps.

Prior art in-line magnetic flow meters are well known instruments in which two electrodes contacting the fluid are spaced apart transverse to a direction of fluid flow in a pipe or tube (i.e., the axis of the pipe) and magnets are arranged to provide a magnetic field orthogonal to both the direction of fluid flow and the line along which the electrodes are spaced. An electrical potential difference developed responsive to fluid flow in a magnetic field is sensed at the electrodes, processed in suitable signal processing electronic circuitry, and provided as a measure of flow rate. The potential difference at the electrodes increases with the path length between electrodes and increases with the magnetic field. In conventional magnetic flow meters the electrode spacing is generally selected to be approximately the same as the diameter of the pipe and the magnetic field is commonly provided by two coils of wire located on opposite sides of and outside of the passage. Sophisticated electronics are used to energize the magnetic field, amplify the tiny flow-related signals generated, and reject various noise and drift signal components which would otherwise degrade measurement precision. These meters are characterized by an unobstructed flow passage offering very low pressure drop and high tolerance to solids in the fluid, high measurement precision, high power consumption, and high cost.

Prior art in-line electro-magnetic pumps are often used for pumping electrically conductive fluids (e.g., molten metal). Apparatus of this sort generally comprises a pair of electrodes spaced out along a line orthogonal to a desired direction of flow and magnets for producing a magnetic field orthogonal to both the direction of fluid flow and the line along which the electrodes are spaced. For the usual situation of flow in a pipe or tube the electrodes are commonly spaced out across a diameter of the pipe and the magnetic field is provided by electro-magnets outside the pipe. Forces on the fluid that cause it to flow are increased if the magnetic field is increased or if the current through the electrodes is increased. In many applications of this technology the electro-magnetic pump is configured to offer a minimal additional impedance to the flow of fluid.

What is not found in the prior art is extensive teaching of electro-magnetic transducers for interacting with fluids flowing in tubes in which a trade-off is made between increased flow impedance and either higher flow meter output signals or increased pumping forces on the fluid. As an example of an application in which such a trade-off may be desirable, one may consider metering the flow of water in cases in which only moderate flow rates are experienced and unobstructed flow passage is relatively unimportant, but low cost and low power consumption for stand alone battery operation may be very important

BRIEF SUMMARY OF THE INVENTION

Generally speaking, it is an object of the invention to provide an electro-magnetic transducer for interaction with a fluid in a tube, where the transducer comprises an electrically insulating sheet scrolled about an axis parallel to or coincident with an axis of the tube. An outer portion of the scroll may be adjacent an inner wall of the tube, and an inner portion of the scroll member may be very close to a streamlined body that is preferably coaxial with the tube. In addition, a transducer of this sort comprises at least one electro-magnet for providing a flux transverse to the tube; at least one pair of electrodes attached to the scroll member and defining a spiral electrical path extending along the scrolled sheet from one of the two electrodes to the other, and at least one electric circuit external to the tube for providing electric power to the at least one electro-magnet.

One version of the electro-magnetic transducer of the invention may be used in flow metering applications. In one preferred embodiment a magnetic flux generated by two electromagnets having magnetic cores is redirected by magnetic pole pieces so as to be orthogonal to both the axis between the electrodes and to a fluid flow direction. As is known in the magnetic flow metering art, the flux and the moving fluid will generate a voltage difference proportional to the flow rate of the fluid, the magnitude of the flux and the length of the conductive path between the electrodes. The voltage difference in the fluid is sensed by at least one, and preferably two pairs of electrodes arranged so that one pair is associated with each location of the pole pieces. In this embodiment, one of the electromagnets is located in a streamlined housing centered within the flow passage and the other electromagnet is on the outside of the passage so as to confine the flow to a quasi-annular ring. The pole pieces from the two magnets are located a selected distance apart and are aligned to reinforce their radial flux through the annular flow passage at two locations along the flow axis, thereby forming a complete magnetic circuit This annular flow passage is organized with a thin electrically insulating sheet wound into a scroll with a generally spiral cross-section This arrangement markedly increases the distance between the electrodes in each pair over what can be provided by the use of either diametrically opposed electrodes in an unobstructed tube, or by an arrangement using the quasi-annular ring of flowing fluid without the scroll.

In the flow meter described above a pair of electrodes is associated with each of the paired poles to sense the corresponding flow generated voltages. That is, flow signals are generated along a spiral path defined by the insulating scroll that is emplaced within the tube. In preferred embodiments, one pair of electrodes is located far enough from the other pair so that their signals have low mutual interaction. This arrangement can provide a combination of an increased fluid flow velocity, a longer path between electrodes and a highly efficient magnetic circuit These features enable a magnetic flow sensor to be produced having substantially greater flow-generated signals than is found in the prior art.

In considering the operation of the flow meter described above, one will recognize that the presence of the scroll and streamlined body within a flow passage reduce the cross sectional area of the flow passage and thereby increases the fluid flow rate at the expense of an increased pressure drop. At a fixed magnetic flux in the passage, the increased flow rate produces correspondingly higher electrode voltages than would be measured if the scroll and body were not there. Moreover, use of magnetic cores with pole pieces to provide a complete, shielded magnetic circuit concentrates the magnetic flux in the desired area. This arrangement enables a higher magnetic circuit efficiency to be achieved than is the case with commonly used air core magnets. Additionally, the magnetic field is generally confined to the annular flow passage in order to reduce problems of magnetic and electro-magnetic compatibility. The use of magnetic cores and pole pieces with prior art magnetic flow meters is generally not practical in larger pipe sizes because the orientation of the field would require a relatively large mass of core material that would increase the size and weight of the meters considerably.

In a preferred flow sensing embodiment, each electrode pair may be used with its own signal amplifying and processing circuitry to provide a flow rate signal. Alternately, signals from multiple pairs may be combined in various ways to provide redundancy and improved measurement precision. Each electrode pair may also be stabilized by short-circuiting the two electrodes of the pair together, or otherwise connecting both of the two electrodes to a common potential during the period when the magnetic field is not present, thereby further helping to reduce measurement errors.

In yet another preferred flow sensing embodiment, a reduction in overall power consumption for situations involving intermittent fluid flow is realized through the use of controller responsive to a second flow sensing means to detect an onset of flow and to then provide electrical power to the flow meter only during the periods of fluid flow.

A preferred pump embodiment of the transducer of the invention has a configuration similar to some of the flow sensing embodiments and employs the extended path provided by the use of a scrolled insulating body inserted into the tube so that the tube axis and the scroll axis are substantially coincident In this embodiment, an AC source supplies currents at the same frequency through both the electromagnets and the electrodes. When these currents are in phase, the fluid is pumped in one direction. When the currents are 180 degrees out of phase, the fluid is pumped in the opposite direction. Changing the currents through either the electromagnets or electrodes controls the magnitude of the pumping action.

Although it is believed that the foregoing recital of features and advantages may be of use to one who is skilled in the art and wishes to learn how to practice the invention, it will be recognized that the foregoing is not intended to list all of the features and advantages. Moreover, it may be noted that various embodiments of the invention may provide various combinations of the hereinbefore recited features and advantages of the invention, and that less than all of the recited features and advantages of the invention may be provided by some embodiments.

DETAILED DESCRIPTION OF THE INVENTION

Figure 1:
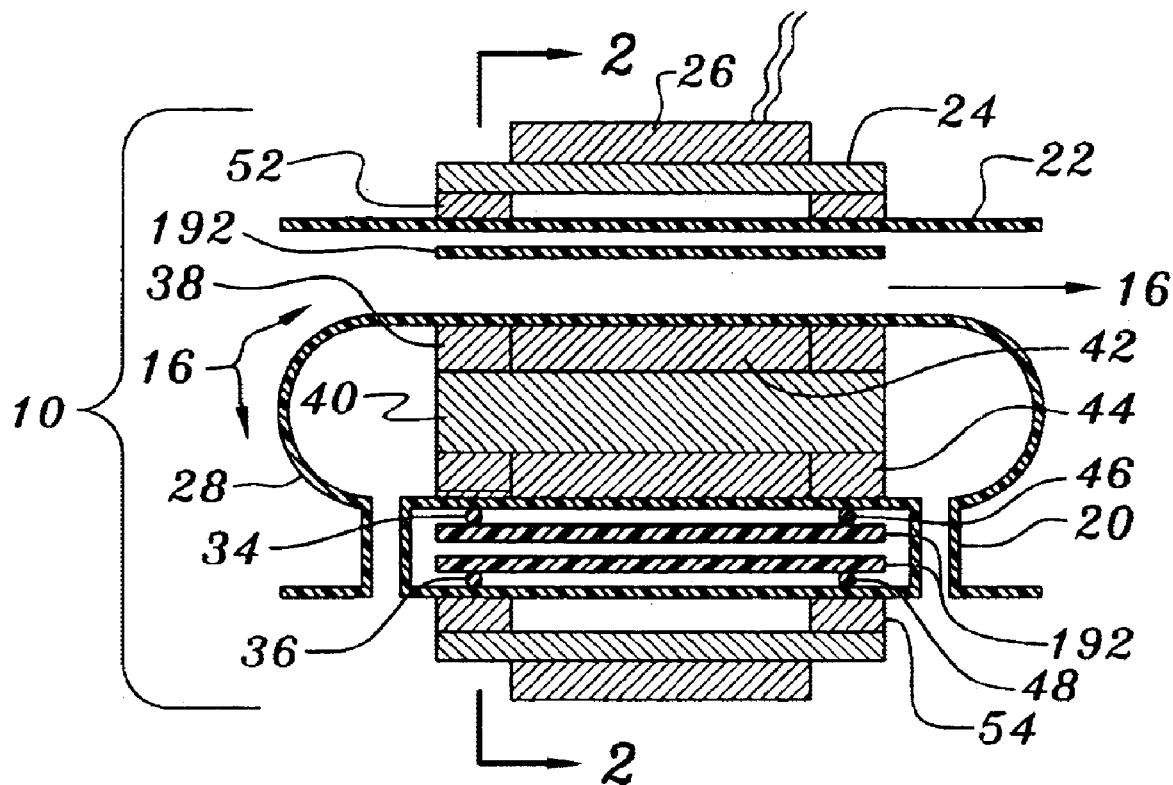
FIG. 1 is a side cross sectional view of a preferred magnetic flow sensing configuration in accordance with a preferred embodiment of the present invention.
Figure 2:
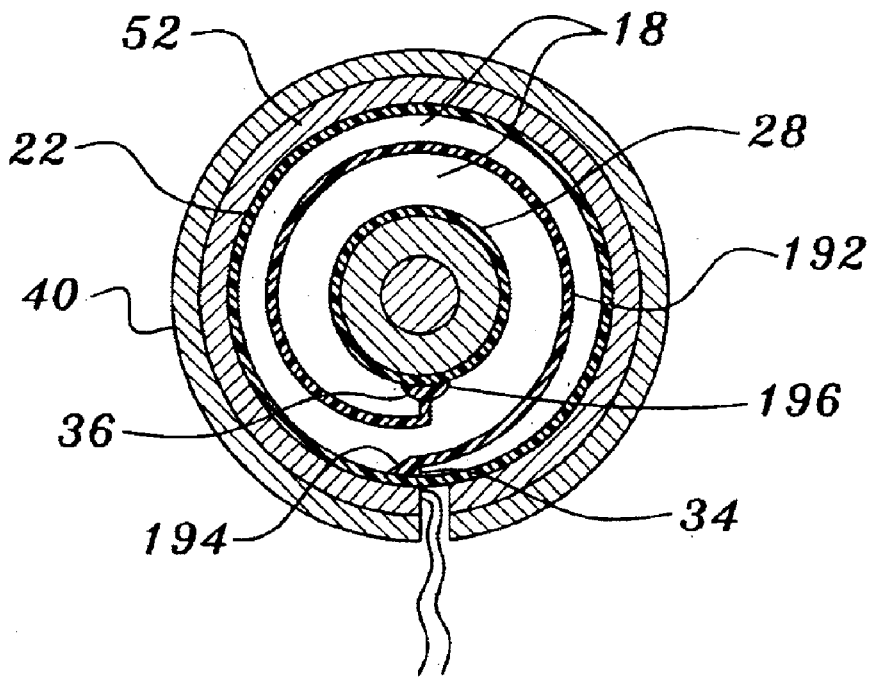
FIG. 2 is a sectional end view of the configuration of FIG. 1 along lines 2—2 depicting the scrolled sheet within the quasi-annular flow ring.

A electro-magnetic transducer 10 made according to a preferred embodiment of the invention is shown in an axial cross sectional view in FIG. 1. An end cross sectional view of the same device, taken as indicated by the double-headed arrow 2—2 in FIG. 1, is depicted in FIG. 2. In this embodiment a tube 22 provides an electrically insulating cylinder confining the fluid 18 that is flowing as indicated by arrows 16. Inside, and generally centered within the tube 22, is an electrically insulating streamlined housing 28 containing inner ring pole pieces 38, 44, a center core 40, and an inner magnet winding 42. Conduits 20 may provide mechanical connection between the tube 22 and the housing 28 upstream or downstream of a portion of the tube in which an insulating scrolled sheet 192 is disposed. The conduits 20 may also be used for routing electrical wiring, which has been omitted from the drawing in the interest of clarity of presentation.

In the transducer 10, at least one pair of electrodes 34, 36 are connected to the scroll 192 so as to be in contact with the fluid 18 when the transducer 10 is in use. The electrodes 34, 36 are thus arranged to measure a voltage difference occurring along an elongated spiral path within the annular or quasi-annular space that exists between the tube 22 and the streamlined body 28 that is depicted as being co-axial with the tube. As depicted in the drawing, the spiral path may extend along a surface of the sheet 192 from a first electrode 34 proximal the flow axis (e.g., adjacent the streamlined body 28) to a second electrode 36 adjacent an inner wall of the tube 22 and distal from the axis thereof.

In preferred embodiments, another similarly configured pair of electrodes 46, 48 is symmetrically located with respect to the second ring pole piece 44. In addition, two outer ring pole pieces 52, 54 are disposed between the tube 22 and an outer cylindrical core 24 which has an outer magnet winding 26 wrapped around it. Slots and holes (not shown) are provided in the various components to enable electrical connections to be made to the electrodes and to the inner magnet winding 42.

The depicted configuration of the electro-magnetic transducer 10 may be modified to gain certain advantages at the expense of others. For example, to simplify mechanical construction an embodiment of the invention could be made with only an external coil 26. In a version such as this, the streamlined housing 28 might contain only the annular ring pole pieces 38, 44, and the core 40 for concentrating the flux, but not include the winding 42. In another approach aimed at reducing size and weight of the transducer, the external winding 26 may be eliminated so that all of the flux is produced from the internal winding 42. In addition to the winding 26, the outer ring pole pieces 52, 54, and the cylindrical core 24 could also be eliminated to enable a particularly small, low cost and lightweight electro-magnetic transducer.

Figure 3:
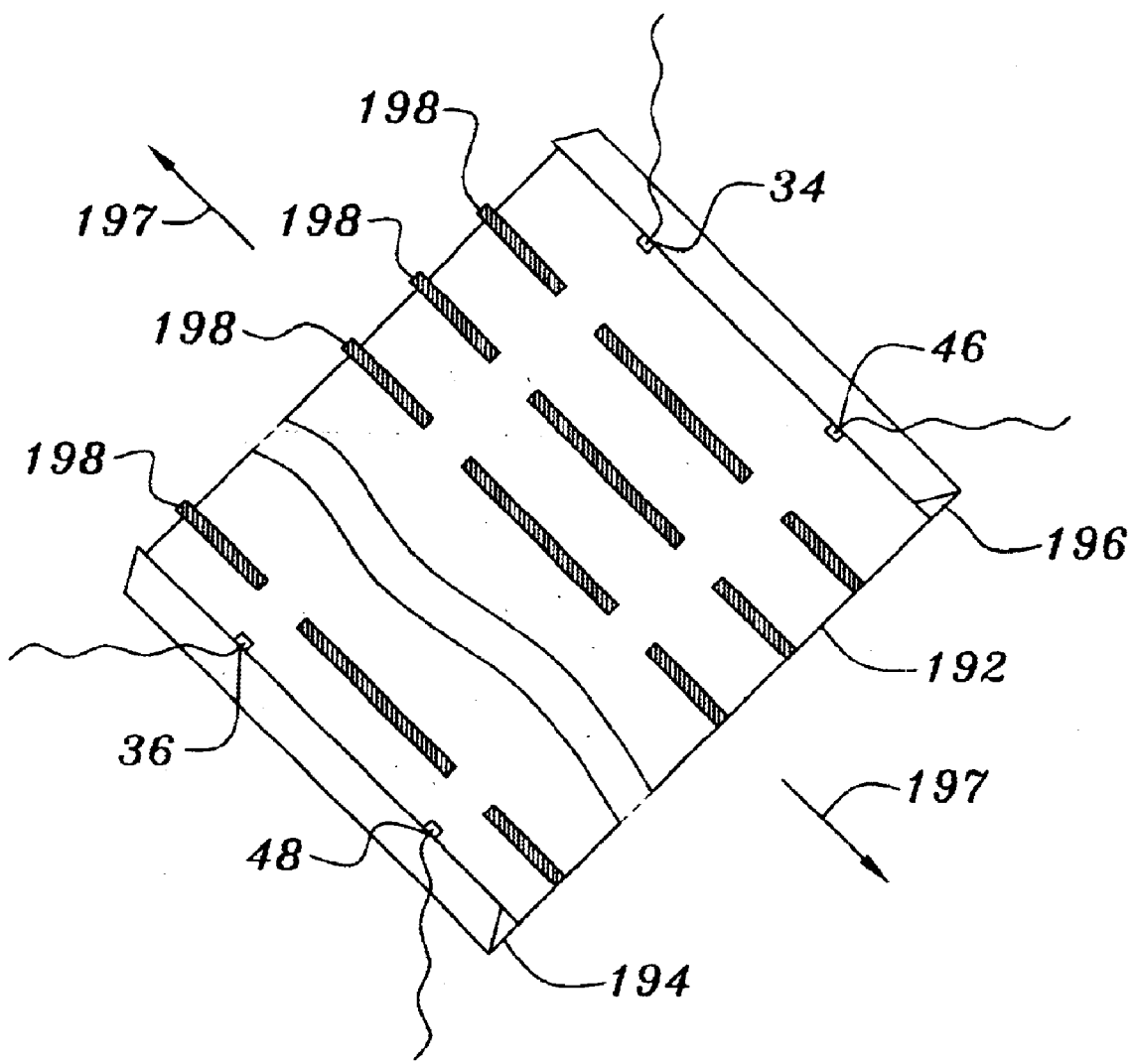
FIG. 3 is a perspective view of an insulating sheet of FIG. 2 before being coiled and installed in a flow tube.

A detailed view of the thin sheet 192 before being wound into a scroll is illustrated in FIG. 3. Electrically insulating spacers 198, configured as ribs extending outward of a surface of the sheet 192 an in a direction along the wrapping axis 197, are used to maintain a fixed radial distance between the portions of the spiral and creates electrically insulating flow channels. One may observe that many alternate ways of providing spacing are known and include but are not limited to deforming the insulating sheet by creasing or dimpling it. Portions of the spacers 198 are preferably omitted adjacent the electrodes 34, 36 in order to provide an unobstructed voltage measurement path between the electrodes. Alternately, a continuous electrical path can be provided in a completely flow-channeled structure by filling in only those portions of the spacers within the voltage path, e.g., the regions shown as gaps in the drawing, with electrical conductors. These spacers 198 are omitted from FIGS. 1 and 2 for the sake of clarity of presentation. Additionally, electrically insulating wedges 194 and 196 may be added to smooth the flow and to provide electrical insulation to the back sides of the electrodes.

As an example of an electro-magnetic transducer of the invention operating as a flow meter, one may consider a configuration as would be used for a nominal ¾" pipe. In this case the insulating sheet 192 may be made from material such as polysulfone or polyetheretherketone and is chosen to be only a few thousandths—e.g., 0.004 inches—thick. This sheet may be wound with a spacing of about nine times its thickness—i.e., about 0.036 inches. At a total thickness of 0.040" for each spiral layer, a number of layers, for example five, could be used to produce the corresponding flow related signals. Because the signals generated from all of the layers are additive, relatively large output signals can be obtained.

Although the drawing depicts a transducer comprising an insulating sheet scrolled generally about an axis of the flow tube so that the fluid flows through the scroll and using at least one electro-magnet to provide a magnetic field transverse to the axis, those skilled in the flow measurement arts will recognize that for flow measurement purposes one could also provide such a magnetic field by the use of one or more permanent magnets.

In operation of a preferred flow meter the two coils 42, 26 are energized at the same time to produce magnetic flux of opposite polarity at the ends of their cores 40, 24. A first pair of inner and outer ring pole pieces 38, 52 provide a low reluctance path and radially concentrate the magnetic flux in a quasi-annular ring of the fluid axially aligned with a first pair 34, 36 of electrodes. The second pair of pole pieces 44, 54 is correspondingly associated with a second pair 46, 48 of electrodes. In comparison to prior art magnetic flow meters, the average distance between electrode pairs can be easily made much greater, the magnetic flux can be easily concentrated in the region used for generating flow-related electrode voltages and the flow velocities can be made relatively high. As a result, the generated electrode voltages are relatively high, thereby enabling advantageous tradeoffs to be made. For example, electrode signal amplification and processing may be simplified because larger signals with greater immunity to noise and interference are available. Moreover, the power supplied to the electromagnets may be reduced in order to lower the overall power requirements of the meter, thereby making it mote practical for self-powered and loop power applications.

Figure 4:
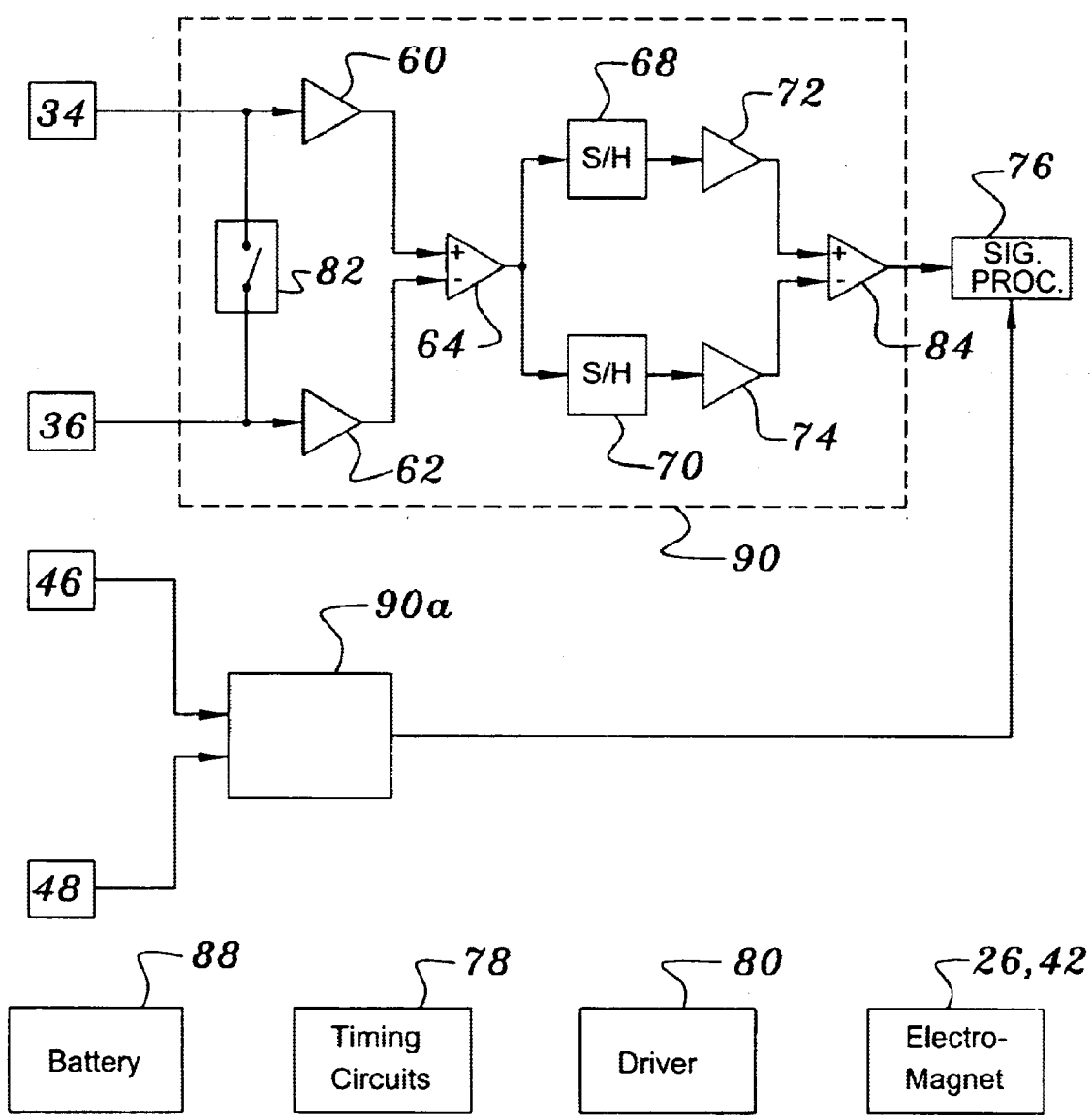
FIG. 4 is a schematic block diagram of an electronics circuit usable with a preferred flow sensing embodiment of the invention.

Turning now to FIG. 4, one finds a simplified block diagram of preferred electronic circuitry used with a magnetic flow sensor of the invention. The electrodes 34 and 36 provide two input signals to a signal amplification circuit block 90, which is used to perform signal amplification and filtering functions. A switch 82, which may be an electromechanical relay, a solid state relay, or any one of many other electrically controllable switching elements known in the art, may be arranged to selectively connect the two electrodes during non-measurement intervals. One of the electrodes 34 is also connected to a first input amplifier 60 and the second electrode 36 is connected to a second input amplifier 62. The outputs from the two input amplifiers 60, 62 are fed to a first differential amplifier 64. The output from the first differential amplifier 64 is fed to two sample and hold circuits 68, 70 that have outputs to respective buffer amplifiers 72, 74 that, in turn, provide inputs to a second differential amplifier 84. The output from the second differential amplifier 84 is input to a signal processor 76. Signals from the second pair of electrodes 46, 48 are supplied to a signal amplification circuit block 90a which is a duplicate of the signal amplification circuit block 90 and which also provides its output signal to the signal processor 76. Other circuit elements required for operation of the sensor of the invention are generally conventional and include timing circuits 78 and driver circuits 80 used to energize the electromagnet windings 26, 42. In some embodiments of the invention to be discussed later in this disclosure, the circuitry also comprises a battery 88 or other exhaustible electric energy source.

During the course of a flow metering cycle of operation, the timing circuits 78 provide a short duration drive pulse (e.g., five milliseconds), to the driver 80 which, in turn, supplies a constant current during a portion of the drive pulse's duration (e.g., two milliseconds) to the electromagnet coils 26, 42. The signals corresponding to the voltages generated in the fluid 18 responsive to both its flow rate and to the magnetic flux from the coils 26, 42 appear at sensing electrodes 34, 36 and are fed to respective input amplifiers 60 and 62. The difference between these amplified signals is extracted by the first differential amplifier 64 and output to the sample and hold circuits 68, 70. The timing circuits 78 provide a first sample pulse to enable the first sample and hold circuit 68 during a portion (e.g., one millisecond) of the interval in which the driver is supplying its constant current output. This selection of a shorter sampling interval allows for circuit tolerances and drifts as well as for amplifier circuit settling. The output from the first sample and hold 68 is buffered by its associated amplifier 72 and is then provided to the positive input of the second differential amplifier 84.

After the magnetic fields produced by the electromagnets 26, 42 have collapsed, the timing circuits 78 provide a relatively long duration pulse—e.g., one hundred milliseconds—to the switch 82 to cause it to short circuit the electrodes 34, 36. The electrodes are shorted together for most of the cycle and any difference in voltage between them, which would have otherwise existed, produces a current between them, which will neutralize their voltage difference. When switch 82 opens its contacts, timing circuits 78 provide a pulse, for example one millisecond wide, to the second sample and hold 70 so that the amplified voltage difference then existing between the first pair of electrodes 34, 36 is sampled, buffered by the associated buffer amplifier 74, and provided to the negative input of the second differential amplifier 84. The output from differential amplifier 84, now representative of the amplified voltage difference between the electrodes 34, 36 for the two conditions of the magnetic field being present and not being present, is an accurate representation of the fluid flow rate and becomes one input to the signal processor 76.

In the foregoing discussion, those skilled in the art will recognize that instead of using a switch 82 to short the electrodes 34, 36 together, one could choose to connect both of those electrodes to a common potential. A flow meter using connections of this sort is specifically taught in the inventor's application Ser. No. 09/820,057, filed on Mar. 28, 2001. The disclosure of Ser. No. 09/820,057 is herein incorporated by reference. Moreover, it will be recognized that the electrodes 34, 36 could be continuously connected to the signal amplifiers, as is common in the prior art.

The combination of the second pair of electrodes 46, 48 and their associated signal amplification block 90a function similarly to the combination of the first pair of electrodes 34, 36 and their associated signal amplification block 90 in order to provide a similar signal to the signal processor 76. As an alternative to the above arrangement, the two electrode pairs 34, 36 and 46, 48 can also time share a single signal amplification block.

The signal processor 76 can be used to integrate its input signals to provide several possible outputs. For example, the processor can sum its input signals to provide a relatively high precision signal having high noise immunity. The difference between multiple input signals may also be extracted and used as an aid to maintenance by providing redundancy.

There are different ways known in the magnetic flow meter art for energizing the magnetic field and for amplifying and detecting the corresponding electrode signals. For the purpose of describing this invention, single polarity DC pulsing has been used Bipolar DC pulsing and AC energization, for example, could also be used In these latter cases the amplifying blocks would have to be modified to include the corresponding signal polarity reversal and other necessary functions.

Because of the small layer-to-layer spacing inherent in the scrolled transducer design, flow meters based on this principle may not be suitable for applications where trash in the fluid can clog up the meter. In those applications a filter would have to be used or another type of meter selected. Furthermore, the presence of the spiral sheet 192 increases the pressure drop across the meter. However, the sharp increase in the electrode signal levels enable corresponding reductions to be made in the energy required for providing the magnetic field so that many stand alone (internal battery for example) or loop powered (4–20 milliampere for example) applications can greatly benefit from this invention.

Figure 5:
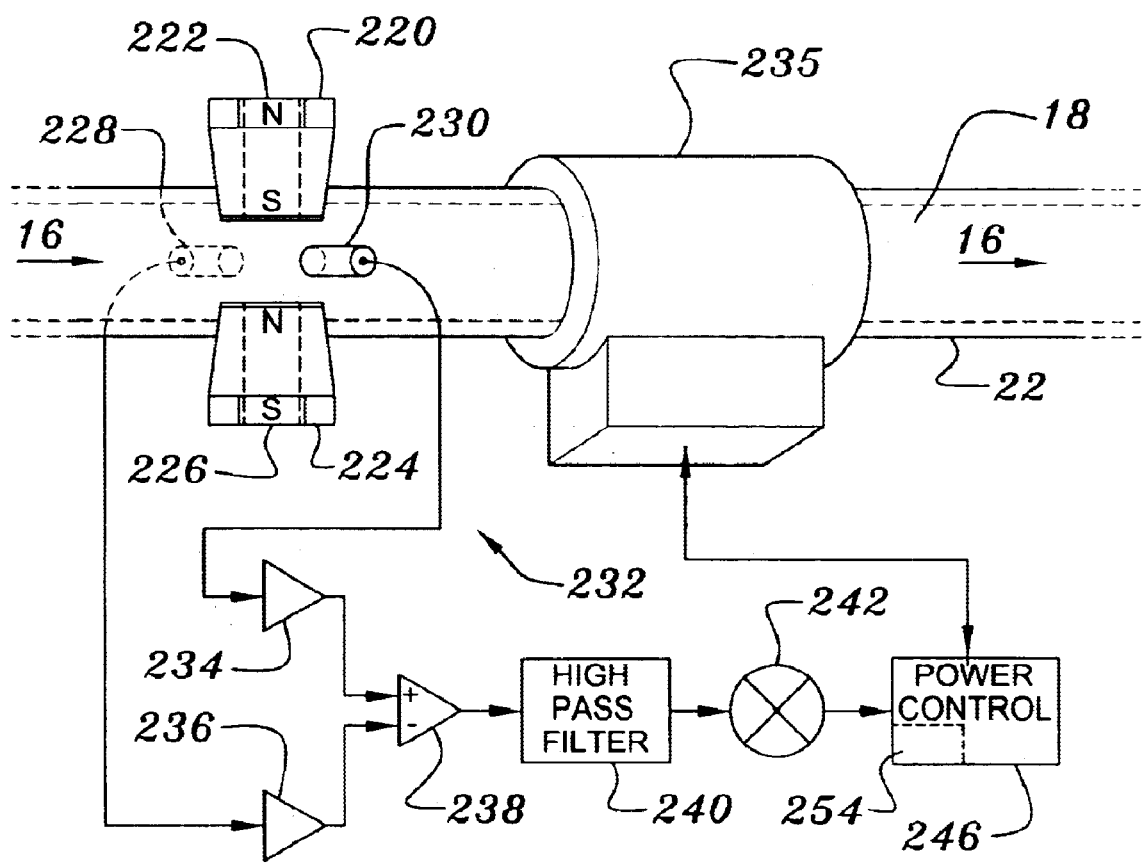
FIG. 5 is schematic view of a flow commencement sensing device that also acts to trap ferromagnetic debris.

Ferromagnetic trash in the fluid being measured may be removed by magnetic traps and these traps may additionally be used to reduce operating power consumption in an approach that will now be disclosed. FIG. 5 depicts two traps 220, 224, comprising respective permanent magnets 222, 226 mounted on a pipe 22 upstream of an electrically powered flow meter 235, that is preferably a magnetic flow meter. The magnets 222 and 226 are oriented with respect to each other to have their closest opposite polarity poles facing each other and thus provide a magnetic flux orthogonal to the flow direction (indicated by arrows 16) of the fluid 18. In order to provide a flow commencement sensing device 232, the voltage difference generated in the fluid 18, when it flows, is sensed by a pair of trap electrodes 228 and 230, which are positioned with the line between them arranged to be orthogonal to both the flow direction and to the magnetic field provided by the magnets 222, 226. The voltage from the first flow commencement electrode 230 is amplified by a first commencement amplifier 234 and the voltage from the second commencement electrode 228 is amplified by a second commencement amplifier 236. The outputs of these amplifiers are input to a differential amplifier 238. The output from the differential amplifier 238 passes through a high pass filter 240 and then through an amplitude detector 242 to a power control 246.

In the preferred arrangement depicted in FIG. 5, a transition from a quiescent, no-flow, state to a situation in which fluid is flowing in the tube leads to a rapid increase in the voltage across the flow commencement sensing electrodes 228, 230. This voltage change is amplified, passed through the high pass filter, and detected by the amplitude detector 242, which causes the power control 246 to supply power to the sensor 235 for a predetermined interval The sensor 235 then supplies a signal responsive to the flow rate of the fluid to the power control 246. If the signal is above a threshold value corresponding to a selected minimum flow rate, the power control 246 continues to supply power to the sensor 235. When the signal magnitude falls below the selected flow threshold level, the power from the power controller 246 is cut off. The unpowered condition continues until the flow rate of the fluid 18 again rises, at which time the rapidly rising output from the flow commencement electrodes 228, 230 again causes the control 246 to supply the flow meter 235 with electrical power. The high pass filter 240 removes the DC and the very low frequency components from the signal so that even with very great signal amplification, electrode drifts and offsets do not influence the reset operation. Should an application exist in which the rise in flow rate could occur so slowly as to be undetectable as a reset trigger signal from the flow commencement sensor, the power control 246 may comprise a timekeeping means 254 so that it can periodically supply power to meter 235 and receive the output therefrom in order to determine whether the minimum flow rate is present.

The electrodes 228, 230 of the flow commencement sensor are preferably made of a material that does not exhibit large polarization effects. In cases of particular interest, in which the fluid flowing along the axis of the tube is water for irrigation purposes, $Ag/AgCl_2$ electrodes have been found to be particularly suitable. These electrodes are available either as a sintered composite or as a silver rod having a chlorinated surface coating.

The combination of a flow commencement sensing device with a second flow measurement device disposed downstream of the flow commencement sensing device and used to provide an output representative of a quantitative measure of the flow is particularly applicable to water meters in municipal water systems. Here, water usage is not continuous and in most cases occurs only during a small fraction of each day. While a somewhat different use pattern is applicable to irrigation service, it is still typical for water usage and requires metering at certain times but not at others. Because the electronic circuits that detect flow commencement and that control meter power can operate on much lower electric power levels (e.g., on the order of a microampere) than those required by the flow meter itself, significant electrical energy savings can be obtained with this approach. It is further noted that one may elect to continuously power data storage circuits and displays which relate to the water consumption and meter programing and that all of the components depicted in FIG. 5 can be integrated into a single housing meter so that the water meter is a single installable item.

Figure 6:
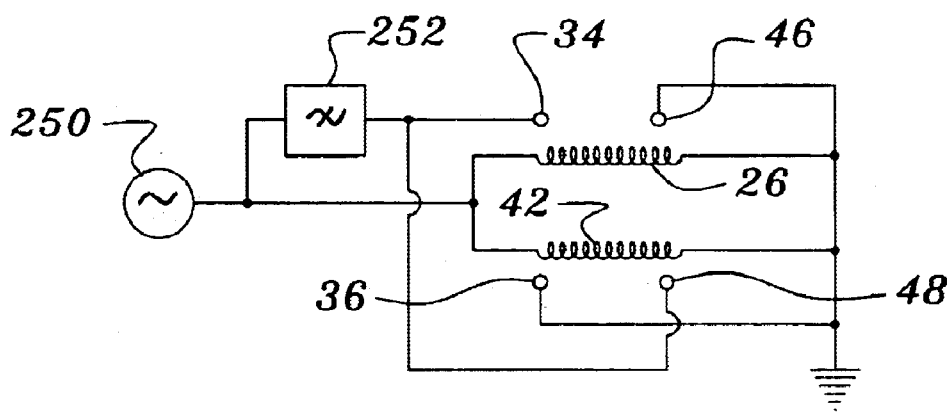
FIG. 6 is a schematic circuit block diagram depicting a transducer of the invention being used as an electro-magnetic pump.

The electro-magnetic transducer 10 having a scrolled insulated sheet 192 is also useful for pumping an electrically conductive fluid. In this application, an AC power source 250 preferably provides AC currents at a single selected frequency through the inner 42 and outer 26 windings and between the first 34, 36 and second 46, 48 pairs of electrodes, as generally depicted in FIG. 6. When these currents are in phase, the fluid is pumped in one direction. If the currents are caused to be 180 degrees out of phase (e.g., by the use of a suitable phase shifting circuit or network 252), the fluid is pumped in the opposite direction. As is known in the electro-magnetic pumping art, changing the magnitude of the electrical currents through either the electromagnets or the paired electrodes controls the magnitude of the pumping action. The scrolled insulating sheet 192 functions to greatly increase the length of the electrically conductive path between ones of the pairs 34, 36 and 46, 48 of electrodes. The electrical currents flowing through these paths generate magnetic fields which react with the magnetic fields generated by the windings 26, 42 to produce the correspondingly large pumping forces.

Although the preferred embodiment of the pump comprises two pairs of electrodes and two sets of windings, those skilled in the art will recognize that similar devices could be made having only one of the windings or having only one of the pairs of electrodes.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specifications and claims.

What is claimed is:

1. An electro-magnetic transducer for interaction with a fluid in a tube, the transducer comprising:
    at least one electro-magnet for providing a flux transverse to a selected portion of the tube;
    an electrically insulating scroll extending along an axis of the selected portion of the tube, an outer portion of the scroll adjacent an inner wall of the tube, an inner portion of the scroll distal therefrom and adjacent the axis of the tube;
    at least one pair of electrodes attached to the scroll at a selected axial position within the selected portion of the tube, the at least one pair of electrodes defining an associated spiral electrical path extending along the scroll from one of the two electrodes of the at least one pair thereof to the other; and
    at least one electric circuit external to the tube for providing electric power to the at least one electro-magnet.

2. The transducer of claim 1 wherein the at least one electric circuit comprises a voltage measurement circuit attached to the at least one pair of electrodes to measure a voltage therebetween, whereby the transducer is configured to interact with the fluid by providing an electrical signal output responsive to flow of the fluid.

3. The transducer of claim 1 wherein the at least one electric circuit comprises an alternating current source attached to the at least one pair of electrodes to supply an alternating electric current therebetween, whereby the transducer is configured to interact with the fluid as an electro-magnetic pump thereof.

4. Apparatus for measuring the flow rate of a fluid in a tube, the apparatus comprising:
    at least one magnet for providing a radial flux of fixed polarity within a selected portion of the tube during a measurement interval;
    an electrically insulating scroll extending along an axis of the selected portion of the tube, an outer portion of the scroll adjacent an inner wall of the tube, an inner portion of the scroll distal therefrom and adjacent the axis; and
    at least one pair of electrodes attached to the scroll at a selected axial position within the selected portion of the tube, the at least one pair of electrodes defining an associated voltage generating path extending along the scroll from one of the two electrodes of the at least one pair thereof to the other.

5. The apparatus of claim 4 further comprising at least one electrically insulating elongated rib extending outwards of a surface of the scroll and extending along the axis.

6. The apparatus of claim 4 further comprising a switching device having two states, the switching device directly electrically connecting the two electrodes of the at least one pair thereof to a common potential when in the first state, the switching device connecting a voltage measurement circuit between the two electrodes of the at least one pair thereof when in the second state.

7. The apparatus of claim 4 further comprising a switching device having two states, the switching device directly electrically connecting the two electrodes of the at least one pair thereof to each other when in the first state, the switching device connecting a voltage measurement circuit between the two electrodes of the at least one pair thereof when in the second state.

8. The apparatus of claim 4 comprising two pairs of electrodes spaced apart along the axis, wherein each of the two pairs of electrodes define a respective voltage generating path extending along the surface of the scroll.

9. The apparatus of claim 4 wherein the at least one magnet comprises at least one permanent magnet.

10. The apparatus of claim 4 wherein the at least one magnet comprises at least one electro-magnet.

11. The apparatus of claim 4 comprising two magnets and a plurality of magnetic pole pieces arranged so that the scroll is within a complete shielded magnetic circuit.

12. An apparatus for making a quantitative measurement of a flow of a fluid through a tube from an upstream portion thereof to a downstream portion thereof, the apparatus comprising, in combination:
    a flow commencement sensing device comprising:
        at least one permanent magnet for generating a magnetic field transverse to the tube;
        at least one pair of electrodes adjacent the at least one permanent magnet and spaced apart along a line that is both transverse to the tube and substantially orthogonal to the magnetic field; and
        a flow sensing circuit connected to the at least one pair of electrodes for sensing a flow-generated voltage therebetween and for providing a flow commencement output to an electric power control unit;
    the apparatus further comprising a flow measurement device disposed downstream of the flow commencement device, the flow measurement device comprising:
        at least one electro-magnet for providing a radial flux of fixed polarity within a selected portion of the tube during a measurement interval;
        an electrically insulating scroll extending along the axis of the selected portion of the tube so as to define a substantially spiral region through which the fluid may flow; and
        at least one pair of electrodes disposed at a selected axial position within the selected portion of the tube, the at least one pair of electrodes defining a respective voltage generating path extending along the surface of the scroll from one of the electrodes in the at least one pair thereof to the other;

wherein the flow measurement device is connected to the power control unit to receive electric power therefrom responsive to the flow commencement output, the flow measurement device, while receiving the electric power, having an output representative of the quantitative measure of the flow.

13. The apparatus of claim 12 wherein the power control unit further comprises an input from the flow measurement device for receiving the output representative of the quantitative measure of the flow.

14. The apparatus of claim 12 wherein the power control unit further comprises a timekeeping means and wherein the flow measurement device is connected to the power control unit to receive electric power therefrom responsive to one of the flow commencement output and an output from the timekeeping means.

15. The apparatus of claim 12 wherein the flow commencement sensing device comprises two permanent magnets spaced apart across a diameter of the tube.

16. The apparatus of claim 12 wherein the flow commencement sensing device comprises at least one permanent magnet for trapping ferromagnetic debris in the fluid.

17. A pump for pumping an electrically conductive fluid in a tube, the apparatus comprising:

at least one electro-magnet for providing a radial flux of alternating polarity within the tube when the fluid is to be pumped;

an electrically insulating sheet scrolled about an axis parallel to or coincident with an axis of the tube, an outer portion of the scrolled sheet adjacent an inner wall of the tube, an inner portion of the scrolled sheet distal therefrom and adjacent the axis of the tube; and at least one pair of electrodes attached to the scrolled sheet, the at least one pair of electrodes defining an associated conduction path extending along the scrolled sheet from one of the two electrodes of the at least one pair thereof to the other.

18. The pump of claim 17 comprising:

a first electro-magnet disposed external to the tube;

a second electro-magnet within a streamlined body disposed along the axis of the tube; and two pairs of electrodes spaced out along the tube.

* * * * *